UNITED STATES PATENT OFFICE.

GEORGE W. TOOKER, OF NEW YORK, N. Y.

ARTIFICIAL IVORY.

SPECIFICATION forming part of Letters Patent No. 452,869, dated May 26, 1891.

Application filed February 28, 1890. Renewed January 3, 1891. Serial No. 376,590. (No specimens.)

*To all whom it may concern:*

Be it known that I, GEORGE W. TOOKER, a citizen of the United States, and a resident of New York, in the county of New York and State of New York, have invented certain new and useful Improvements in Artificial Ivory, of which the following is a specification.

The invention relates to the production of artificial ivory, to be employed in the manufacture of knife-handles, billiard-balls, and other articles now usually made of ivory, bone, and similar substances. The material made, as herein described, is adapted for use as a substitute for ivory, and is capable of being cut and shaped in accordance with the desire of the manufacturer and the nature of the article to be produced.

In carrying my invention into effect I take, say, twenty (20) parts of albumen in powdered or lump form and dissolve it in thirty (30) parts of water and preferably one (1) part of glycerine. This solution, formed by the albumen, water, and glycerine, has then added to it twenty (20) parts of bone-ash powder and twenty (20) parts of talc. If a grain resembling the grain in ivory is desired, in the final product to the compound described above is added from one (1) to two (2) parts of finely-divided fiber, such as cotton or silk fiber or paper fiber. The composition is then thoroughly mixed, so as to thoroughly commingle the elements composing it, the result being a thick paste. This paste I dry at a low temperature of about 50° centigrade or less, the same being allowed to stand for several days, more or less, according to the quantity and condition of the mass. When this paste is nearly dry, I inclose it in a mold and subject the same to heat and pressure, the heat lasting from four to six hours at a temperature ranging from 100° to 150° centigrade. The effect of the heat and pressure upon the mass is to render the albumen insoluble and impervious to moisture and solidify the compound, the pressure entirely closing any pores or cells that may have been formed therein.

The mixing of the elements introduced into the solution of albumen may be accomplished by the usual well-known machinery adapted for that purpose, such as the usual calendered mixing-rollers. In the employment of these rollers the paste should be passed through them several times, after which it will be dried and subjected to heat and pressure, as above described. After the mass has been subjected to heat and pressure for the requisite length of time, as above described, it is allowed to cool, and is finally dried under a temperature of about 70° to 80° centigrade. The material produced, as above described, presents a fine consistency, adapted as a substitute for ivory, and may be shaped and cut in the manner desired for the production of the articles to which it may be applied.

It is necessary for me to state that the proportions above set forth may be varied in accordance with the nature of the use to which the production is to be applied. It is true, also, that the ingredients themselves may vary according to the result desired. For instance, if the production is to be employed in the manufacture of billiard-balls requiring a definite degree of elasticity, the proportion of glycerine may be increased with good results; but in the production of articles requiring no elasticity the glycerine may be entirely omitted. The talc adds to the body of the material and renders the product capable of receiving a fine finish. If a harder product than that above described is desired, I would recommend that but one-half of the quantity of talc above mentioned be used with an equal part of magnesia or its salts or dry quicklime, the effect being to produce a fine hard compound.

It is obvious that if it is not desired that the product should have a grain resembling ivory the proportion of fiber may be entirely omitted; but where the grain is desired I recommend that some suitable fiber be incorporated. I am able, also, to produce veins through the mass by the addition to the solution of albumen of a solution of shellac in ammonia or powdered gum-kauri.

It is not necessary for the present application that I should go into details as to the coloring of the compound, since it is obvious that pigments may be introduced to vary the color, as desired. The process described above would produce without pigments a white compound; but should it not prove to be sufficiently white for the articles to be made from it, then an addition of a little ultramarine or cobalt to the original solution of albumen will accomplish the purpose of rendering the product sufficiently white for all purposes.

The material produced in accordance with the invention above described I designate "oss-ebur."

What I claim as my invention, and desire to secure by Letters Patent, is—

1. The material hereinbefore described, made from albumen, bone-ash powder, and talc, substantially as described.

2. The material hereinbefore described, made from albumen, bone-ash powder, talc, and fibrous material, substantially as set forth.

Signed at New York, in the county of New York and State of New York, this 27th day of February, A. D. 1890.

GEORGE W. TOOKER.

Witnesses:
CHAS. C. GILL,
E. D. MILLER.